Feb. 24, 1931.  H. C. ROLFE  1,794,248
PLANE HANDLE
Filed Nov. 5, 1929
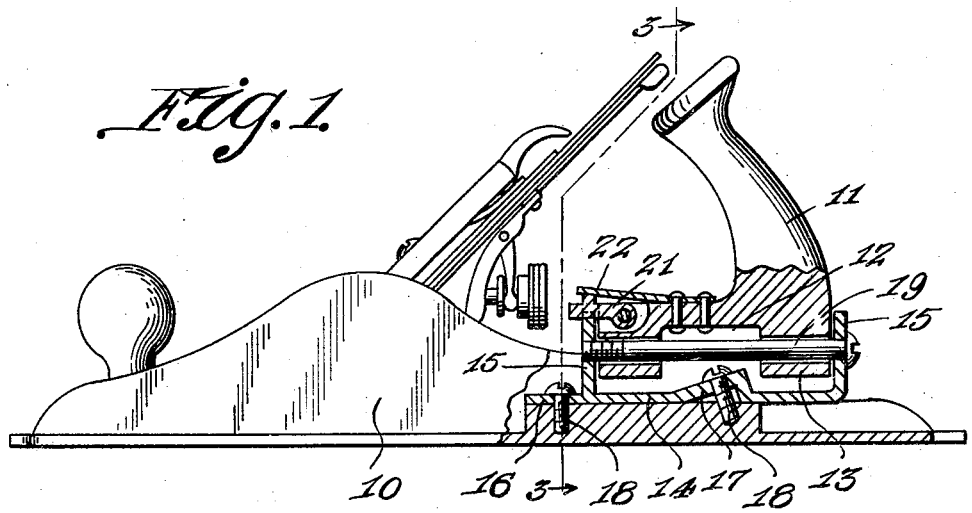
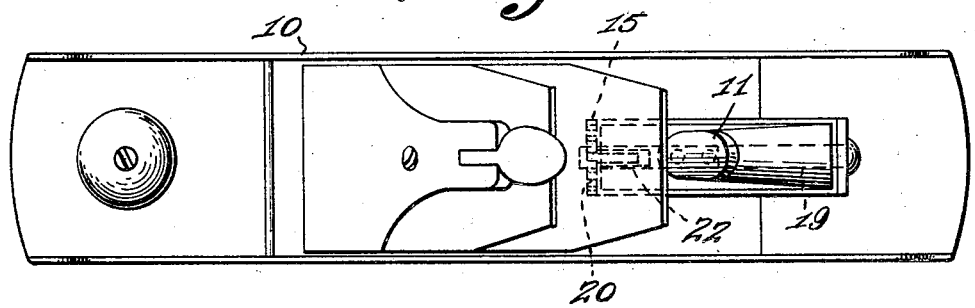
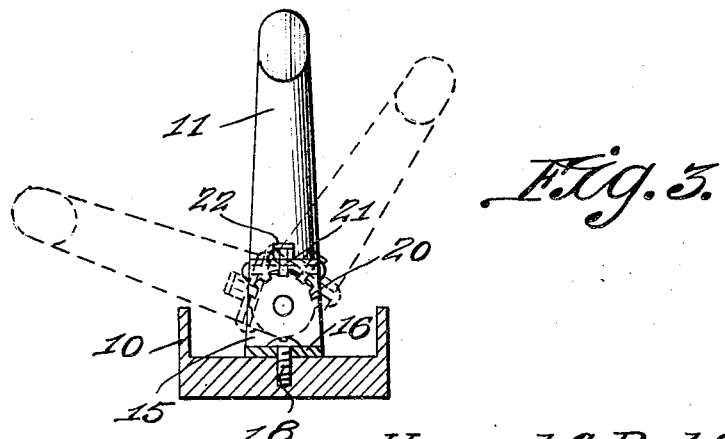
Howard C. Rolfe, INVENTOR
BY *Victor J. Evans*
ATTORNEY

UNITED STATES PATENT OFFICE

HOWARD C. ROLFE, OF CLARKDALE, ARIZONA

PLANE HANDLE

Application filed November 5, 1929. Serial No. 404,945.

The present invention relates to carpenters' planes, and contemplates a structure wherein the handle can be adjusted laterally and held fixed with relation to the tool in any given position, whereby the tool can be conveniently manipulated in corners and other close places, the invention residing in the construction, combination and arrangement of parts as claimed.

In the drawing forming part of this application like numerals of reference indicate similar parts in the several views, and wherein:—

Figure 1 is a side elevation of the tool partly in section.

Figure 2 is a top plan view.

Figure 3 is a sectional view on line 3—3 of Figure 1 showing the handle in different adjusted positions.

Referring to the drawing in detail, 10 indicates a frame generally of any well known construction, the handle for which is indicated at 11. This handle 11 in accordance with the present invention is recessed on its underside as at 12, to provide the handle with spaced end portions 13, which are utilized to support the handle for adjustment in the manner to be presently described.

Mounted upon the base of the tool is a base plate 14, rising from the opposed ends of which are spaced vertical flanges 15. Projecting beyond one flange is an attaching flange 16, while the base plate 14 is slightly raised at an appropriate point in its length as at 17, and passed through this raised portion and the attaching flange 16 are suitable fastening elements 18. The spaced end portions 13 of the handle are longitudinally bored to receive a pivot bolt 19, which bolt is supported by the vertical flanges 15 of the base plate, and by reason of this construction it is manifest that the handle 11 can be adjusted laterally to occupy any desired angular position with relation to the tool, to permit the latter to be conveniently and easily manipulated in corners and other close places.

For the purpose of holding the handle 11 fixed in its given position, I provide one of the vertical end flanges 15 with a plurality of notches 20, while pivoted upon the handle 11 is a pawl 21 adapted to be singly received by the notches 20 as will be readily understood. Also carried by the handle 11 and arranged directly above the pawl is a leaf spring 22 which serves to hold the pawl partly positioned within one of the notches 20. The pawl projects a slight distance beyond the adjacent flange 15 so that it can be quickly and conveniently elevated to an inactive position and allow the handle to be easily adjusted to its desired position.

While it is believed that from the foregoing description the nature and advantages of the invention will be readily apparent, I desire to have it understood that I do not limit myself to what is herein illustrated and described and that such changes may be resorted to when desired as fall within the scope of what is claimed.

What I claim is:—

A plane handle comprising an attaching plate positioned on a plane and having one end bent angularly to provide an upstanding portion, a second upstanding portion having notches formed on the plate and spaced from the other end thereof to permit said last named end to provide an attaching ear, said plate being off-set to provide a shoulder between the upstanding portions, means securing the ear and shoulder to the plane, a bolt connecting the upstanding portions, a handle journaled on the bolt and having a cut-out portion disposed over the off-set in the plate, a pivoted pawl carried by the handle to engage any one of the notches and projecting beyond the second mentioned upstanding portion to permit the removal thereof from a notch, and a tension member carried by the handle to prevent accidental displacement of the pawl from the notch engaged.

In testimony whereof I affix my signature.

HOWARD C. ROLFE.